United States Patent [19]
Davis et al.

[11] 4,236,898
[45] Dec. 2, 1980

[54] FRICTION MODIFIER FOR GASOLINE

[75] Inventors: Bryan T. Davis, West Bloomfield; James B. Retzloff, Royal Oak, both of Mich.

[73] Assignee: Ethyl Corporation, Richmond, Va.

[21] Appl. No.: 35,792

[22] Filed: May 3, 1979

[30] Foreign Application Priority Data

May 12, 1978 [FI] Finland .................................. 781503

[51] Int. Cl.³ .............................................. C10L 1/24
[52] U.S. Cl. .......................................... 44/66; 44/71; 44/72; 44/76
[58] Field of Search ........................ 44/66, 76, 71, 72; 252/402

[56] References Cited

U.S. PATENT DOCUMENTS

| | | | |
|---|---|---|---|
| 1,990,365 | 2/1935 | Beale | 44/66 |
| 3,509,052 | 4/1970 | Murphy | 252/34.7 |

*Primary Examiner*—Jacqueline V. Howard
*Attorney, Agent, or Firm*—Donald L. Johnson; Robert A. Linn; Willard G. Montgomery

[57] ABSTRACT

Fuel consumption of an internal combustion engine being operated on a normally liquid hydrocarbon fuel of the gasoline boiling range is reduced by the addition to the fuel of a friction-reducing amount of a sulfurized fatty acid amide, ester or ester-amide of an oxyalkylated amine.

6 Claims, No Drawings

FRICTION MODIFIER FOR GASOLINE

BACKGROUND OF THE INVENTION

In order to conserve crude oil, Federal regulations recently have been enacted which compel auto manufacturers to achieve prescribed gasoline mileage. One approach to achieving the required mileage has been to down-size new cars to make them lighter.

Another approach to improving fuel mileage has been in the development of energy-saving fuel additives which reduce engine friction. The present invention is concerned with the latter approach.

Polyethoxylated oleamide is commercially available under the name "Ethomid" (registered trademark, Armak Company). Reference to its use as a demulsifier in lubricating oil appears in U.S. Pat. No. 3,509,052.

SUMMARY OF THE INVENTION

According to the present invention normally liquid hydrocarbon fuels of the gasoline boiling range are provided which reduce friction between sliding metal surfaces in internal combustion engines. The reduced friction results from the addition to the hydrocarbon fuel of a small amount of a sulfurized fatty acid amide, ester or ester-amides of alkoxylated amine such as diethanolamine.

DESCRIPTION OF THE PREFERRED EMBODIMENT

A preferred embodiment of the present invention is a gasoline for use in a spark-ignited internal combustion engine comprising a major amount of a normally liquid hydrocarbon of the gasoline boiling range and a minor friction-reducing amount of an additive selected from sulfurized fatty acid esters, sulfurized fatty acid amides and sulfurized fatty acid ester-amides of an alkanol amine, said amine having the formula

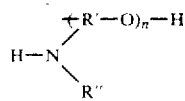

wherein R' is a divalent aliphatic hydrocarbon radical containing 2–4 carbon atoms, n is an integer from 1 to 10, and R" is selected from hydrogen and the group $-(R'O)_n-H$.

The additives can be made by reacting a sulfurized fatty acid with an oxyalkylated amine (e.g. diethanolamine). Alternatively, sulfurized fatty acid amide can be made by reacting sulfurized fatty acid with ammonia or an alkanol amine (e.g. ethanolamine, diethanolamine) to form an intermediate which can be further oxyalkylated by reaction with an alkylene oxide (e.g. ethylene oxide, propylene oxide).

Another method is to first make the fatty acid ester, amide or ester-amide by reacting a fatty acid with an oxyalkylated amine (e.g. diethanolamine) and then reacting that intermediate with elemental sulfur at elevated temperature (e.g. 100° to 250° C.).

Sulfurized fatty acids can be made by heating a mixture of fatty acid with elemental sulfur. Unsaturated fatty acids are preferred such as hypogeic acid, oleic acid, linoleic acid, elaidic acid, erucic acid, brassidic acid, tall oil fatty acids and the like. Sulfurized oleic acid is most preferred. Sulfurized oleic acid is a commercial product.

The preferred amines used to make the additives are ethoxylated amines such as ethanolamine, diethanolamine, isopropanolamine and the like. These can be reacted to form both amides and esters. Using diethanolamine as an example, sulfurized oleic acid, (S)oleic, reacts as follows:

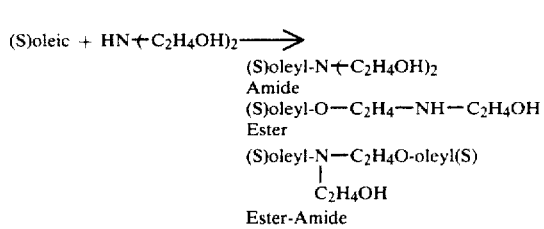

When equal mole amounts of sulfurized fatty acid and diethanolamine are used the product contains mainly amide because of the greater reactivity of the HN<-group. When sulfurized oleic acid the product is about 60–90 weight percent amide and 10–40 weight percent ester. Use of larger amounts of fatty acid increases the content of ester-amide components.

The above represents the preferred additives. They can be further reacted with alkylene oxide to form a polyoxyalkylene chain. The following reaction illustrates this:

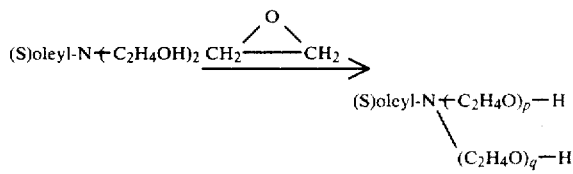

wherein p and q are integers independently selected from 1 to about 10.

Oxyalkylation of the ester components of the product mix would give the following type products:

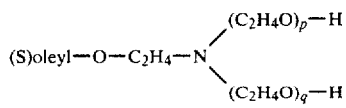

wherein p and q are as above.

Alternatively, the sulfurized fatty acid can be reacted with ammonia to form amide which can then be reacted with alkylene oxide. Using one mole of sulfurized oleamide and (p+q) moles of ethylene oxide this reaction would proceed as follows:

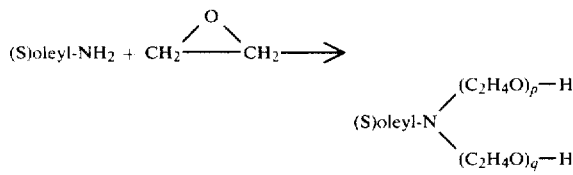

wherein p and q are as above. This method gives amide only without the ester or ester-amide components.

A still further alternative is to follow any of the above methods using unsulfurized fatty acid and to post-react the intermediate product with sulfur at elevated temperatures.

EXAMPLE

In a reaction vessel was placed 308 gms (1 equiv) of a commercial sulfurized oleic acid (Cincinnati Milacron), 105 gms (1 mole) diethanolamine and a small amount of xylene. The mixture was heated under nitrogen to 185° C. over two hours while removing water. The mixture was then stirred of solvent under vacuum leaving the product. It was analyzed for nitrogen. (Found 3.48 percent total nitrogen, 0.93 percent basic nitrogen.) This shows a mixture of 73 weight percent sulfurized oleamide of diethanolamine and 27 weight percent sulfurized oleate ester of diethanolamine.

Other sulfurized fatty acids can be substituted for sulfurized oleic acid in the above example with good results.

The additives are used in an amount sufficient to reduce the sliding friction of metal surfaces in an internal combustion engine operating on a normally liquid hydrocarbon fuel containing the additive. An effective concentration is about 0.01–1.0 weight percent. A more preferred range is about 0.05–0.5 weight percent.

Since the invention also embodies the operation of an internal combustion engine in a manner which results in reduced fuel comsumption another embodiment of the present invention is a method of lowering the fuel comsumption of an internal combustion engine, said method comprising operating said engine on a fuel comprising a major amount of a normally liquid hydrocarbon of the gasoline boiling range and a friction reducing amount of an additive selected from sulfurized fatty acid esters, sulfurized fatty acid amides and sulfurized fatty acid ester-amides of an alkanol amine, said amine having the formula

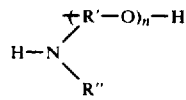

wherein R' is a divalent aliphatic hydrocarbon radical containing 2–4 carbon atoms, n is an integer from 1 to 10, and R" is selected from hydrogen and the group $+R'O)_n-H$.

Liquid hydrocarbon fuels of the gasoline boiling range are mixtures of hydrocarbons having a boiling range of from about 80° F. to about 430° F. Of course, these mixtures can contain individual constituents boiling above or below these figures. These hydrocarbon mixtures contain aromatic hydrocarbons, saturate hydrocarbons and olefinic hydrocarbons. The bulk of the hydrocarbon mixture is obtained by refining crude petroleum by either straight distillation or through the use of one of the many known refining processes, such as thermal cracking, catalytic cracking, catalytic hydroforming, catalytic reforming, and the like. Generally, the final gasoline is a blend of stocks obtained from several refinery processes. The final blend may also contain hydrocarbons made by other procedures such as alkylate made by the reaction of $C_4$ olefins and butanes using an acid catalyst such as sulfuric acid or hydrofluoric acid.

Preferred gasolines are those having a Research Octane Number of at least 85. A more preferred Research Octane Number is 90 or greater. It is also preferred to blend the gasoline such that it has a content or aromatic hydrocarbons ranging from 10 to about 60 volume percent, an olefinic hydrocarbon content ranging from 0 to about 30 volume percent, and a saturated hydrocarbon content ranging from about 40 to 80 volume percent, based on the whole gasoline.

In order to obtain fuels having properties required by modern automotive engines, a blending procedure is generally followed by selecting appropriate blending stocks and blending them in suitable proportions. The required octane level is most readily accomplished by employing aromatics (e.g. BTX, catalytic reformate or the like), alkylate (e.g. $C_{6-9}$ saturates made by reacting $C^4$ olefins with isobutane using HF or $H_2SO_4$ catalyst), or blends of different types.

The balance of the whole fuel may be made up of other components such as other saturates, olefins, or the like. The olefins are generally formed by using such procedures as thermal cracking, catalytic cracking and polymerization. Dehydrogenation of paraffins to olefins can supplement the gaseous olefins occurring in the refinery to produce feed material for either polymerization or alkylation processes. The saturated gasoline components comprise paraffins and naphthenates. These saturates are obtained from (1) virgin gasoline by distillation (straight run gasoline), (2) alkylation processes (alkylates) and (3) isomerization procedures (conversion of normal paraffins to branched chain paraffins of greater octane quality). Saturated gasoline components also occur in so-called natural gasolines. In addition to the foregoing, thermally cracked stocks, catalytically cracked stocks and catalytic reformates contain saturated components.

The classification of gasoline components into aromatics, olefins and saturates is well recognized in the art. Procedures for analyzing gasolines and gasoline components for hydrocarbon composition have long been known and used. Commonly used today is the FIA analytical method involving fluorescent indicator adsorption techniques. These are based on selective adsorption of gasoline components on an activated silica gel column. The components being concentrated by hydrocarbon type in different parts of the column. Special fluorescent dyes are added to the test sample and are also selectively separated with the sample fraction to make the boundaries of the aromatics, olefins and saturates clearly visible under ultraviolet light. Further details concerning this method can be found in "1969 Book of ASTM Standards", January 1969 Edition, under ASTM Test Designation D 1319-66T.

The motor gasolines used in formulating the improved fuels of this invention generally have initial boiling points ranging from about 80° to about 105° F. and final boiling points ranging from about 380° to about 430° F. as measured by the standard ASTM distillation procedure (ASTM D-86). Intermediate gasoline fractions boil away at temperatures within these extremes.

From the standpoint of minimizing atmospheric pollution to the greatest extent possible, it is best to keep the olefin content of the fuel as low as can be economically achieved as olefins reportedly give rise to smog-forming emissions, especially from improperly adjusted vehicular engines. Accordingly, in the preferred base stocks of this invention the olefin content will not exceed about 10 volume percent and the most particularly preferred fuels will not contain more than about 5 percent olefins. Table 1 illustrates the hydrocarbon type makeup of a number of particularly preferred fuels for use in this invention.

TABLE I

Hydrocarbon Blends of Particularly Preferred Base Fuels

| Fuel | Aromatics | Volume Percentage Olefins | Saturates |
|---|---|---|---|
| A | 35.0 | 2.0 | 63.0 |
| B | 40.0 | 1.5 | 58.5 |
| C | 20.0 | 2.5 | 77.5 |
| D | 33.5 | 1.0 | 65.5 |
| E | 36.5 | 2.5 | 61.0 |
| F | 43.5 | 1.5 | 55.0 |
| G | 49.5 | 2.5 | 48.0 |

It is also desirable to utilize base fuels having a low sulfur content as the oxides of sulfur tend to contribute an irritating and choking character to smog and other forms of atmospheric pollution. Therefore, to the extent it is economically feasible, the fuel will contain not more that about 0.1 weight percent of sulfur in the form of conventional sulfur-containing impurities. Fuels in which the sulfur content is no more than about 0.22 weight percent are especially preferred for use in this invention.

Normally the gasoline to which this invention is applied is lead-free or substantially lead-free, although small amounts of organolead additives usually employed to give fuels of improved performance quality such as tetraalkyllead antiknocks including tetramethyllead, tetraethyllead, physical or redistributed mixtures of tetramethyllead and tetraethyllead, and the like may be present therein. The gasoline may also contain antiknock quantities of other agents such as cyclopentadienyl nickel nitrosyl, N-methyl aniline, as well as the various aforementioned ethers such as methy tertiary butyl ether. Antiknock promoters such as tert-butyl acetate may be included. The gasoline may further contain blending agents or supplements such as methanol, ethanol, isopropanol, tert-butanol and the like. Antioxidants such as 2,6-di-tert-butylphenol, 2,6-di-tert-butyl-p-cresol, phenylenediamines such as N,N'-di-sec-butyl-p-phenylenediamine, N-isopropylphenylenediamine, and the like, may be present. Likewise, the gasoline can contain dyes, metal deactivators, or other types of additives recognized to serve some useful purpose in improving the gasoline quality.

Cyclopentadienyl manganese tricarbonyls are known antiknocks and their preparation and use are described in U.S. Pat. Nos. 2,818,417, 2,839,552, and 3,127,351. An important antiknock of this type is methylcyclopentadienyl manganese tricarbonyl. The amount of the cyclopentadienyl manganese tricarbonyl added to the gasolines should be an amount adequate to increase its antiknock effectiveness. This has generally been found to be in the range of from about 0.005 to 10 grams per gallon of manganese as a cyclopentadienyl manganese tricarbonyl. A preferred range is from about 0.05 to 6 grams of manganese per gallon as a cyclopentadienyl manganese tricarbonyl. A more preferred range is from about 0.05 to about 0.25 grams of manganese per gallon, and a most preferred range is from about 0.05 to about 0.125 grams of manganese per gallon as methylcyclopentadienyl manganese tricarbonyl.

Normally, the friction reducing additives of the present invention are merely added by bulk addition to the hydrocarbon mixture.

Tests have been carried out which demonstrate the ability of the present fuel composition to significantly improve fuel economy. Tests were carried out in a 1978 U.S. production automobile having an inline-6 cylinder engine. The car was operated on a chassis dynamometer under controlled temperature and humidity conditions. Each test series consisted of 3 warmed-up shortened EPA city and full EPA highway cycles run in alternate fashion during which mpg measurements were made. These tests were conducted before and after accumulating 500 miles on the car. A 45-minute warm-up at 55 mph proceeded each test series. Mpg measurements showed immediate fuel reduction as well as fuel reduction at the end of 500 miles. The shortened city cycle consisted of the first 3.6 miles of the 11.1-mile city cycle. The sequence of testing consisted of testing first clear Indolene fuel (baseline) followed by a test using the same fuel plus 0.1 weight percent of a mixture prepared as described in the Example. The results are reported in the following table in terms of mpg percent improvement over baseline.

TABLE A

| Test Cycle | Average Percent Improvement In mpg. |
|---|---|
| Short City Cycle | |
| Immediate[1] | 1.19% |
| After 500 Miles[2] | 0.26% |
| Highway Cycle | |
| Immediate[1] | 1.25% |
| After 500 Miles[2] | 0.63% |

[1]Average of 3 individual measurements
[2]Average of 2 individual measurements

We claim:

1. As a composition of matter, a liquid hydrocarbon fuel for use in a spark-ignited internal combustion engine comprising a major amount of normally liquid hydrocarbon of the gasoline boiling range and a friction-reducing amount of an additive selected from sulfurized fatty acid esters, sulfurized fatty acid amides and sulfurized fatty acid ester-amides of an alkanol amine, said amine having the formula

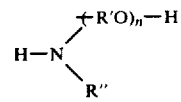

wherein R' is divalent aliphatic hydrocarbon radical containing 2-4 carbon atoms, n is an integer from 1 to 10, and R" is selected from hydrogen and the group $+(R'O)_n-H$.

2. A composition of claim 1 wherein said sulfurized fatty acid is sulfurized oleic acid.

3. A composition of claim 2 wherein said additive comprises a sulfurized oleamide of diethanolamine.

4. A composition of claim 2 wherein said additive comprises a sulfurized oleate ester of diethanolamine.

5. A composition of claim 2 wherein said additive comprises a mixture containing about 60–90 weight percent sulfurized oleamide of diethanolamine and about 10–40 weight percent sulfurized oleate ester of diethanolamine.

6. The method of lowering the fuel consumption of an internal combustion engine said method comprising operating said engine on the fuel composition of claim 1.

* * * * *